(12) United States Patent
Juhlin

(10) Patent No.: US 8,847,430 B2
(45) Date of Patent: Sep. 30, 2014

(54) POWER FLOW CONTROL IN A MESHED HVDC POWER TRANSMISSION NETWORK

(75) Inventor: Lars-Erik Juhlin, Ludvika (SE)

(73) Assignee: ABB Technology AG, Zürich (CH)

( * ) Notice: Subject to any disclaimer, the term of this patent is extended or adjusted under 35 U.S.C. 154(b) by 566 days.

(21) Appl. No.: 13/262,926

(22) PCT Filed: Apr. 6, 2009

(86) PCT No.: PCT/EP2009/054098
§ 371 (c)(1),
(2), (4) Date: Oct. 5, 2011

(87) PCT Pub. No.: WO2010/115452
PCT Pub. Date: Oct. 14, 2010

(65) Prior Publication Data
US 2012/0033462 A1 Feb. 9, 2012

(51) Int. Cl.
*H02J 1/14* (2006.01)
*H02J 3/36* (2006.01)

(52) U.S. Cl.
CPC ... *H02J 3/36* (2013.01); *Y02E 60/60* (2013.01)
USPC .................................. 307/82; 307/51; 363/35

(58) Field of Classification Search
USPC .......................................... 307/82, 51; 363/35
See application file for complete search history.

(56) References Cited

FOREIGN PATENT DOCUMENTS

EP    1 919 054 A2    5/2008

OTHER PUBLICATIONS

Baran et al., "DC Distribution for Industrial Systems: Opportunities and Challenges", IEEE Transactions on Industry Applications, IEEE Service Center, Piscataway, NJ, Nov. 1, 2003, vol. 39, No. 6, pp. 1596-1601.
Lasseter, R.N., "Electronics at the Core Layer of Power Flow Control" [Online], XP-002533805, http://www.conferences.uiuc.edu/supergrid/PDF/SG2_Lasseter.pdf, Oct. 25, 2004 (18 pages).

*Primary Examiner* — Hal Kaplan
(74) *Attorney, Agent, or Firm* — Birch, Stewart, Kolasch & Birch, LLP

(57) ABSTRACT

A meshed HVDC power transmission network comprises at least three HVDC converter stations interconnected in a first closed path by at least three transmission lines. A first DC power flow control device is series connected to a first of the at least three transmission lines. That first DC power flow control device takes its power from the first transmission line and balances the DC current distribution in the first closed path.

20 Claims, 5 Drawing Sheets

POWER FLOW CONTROL IN A MESHED HVDC POWER TRANSMISSION NETWORK

Figure 1:
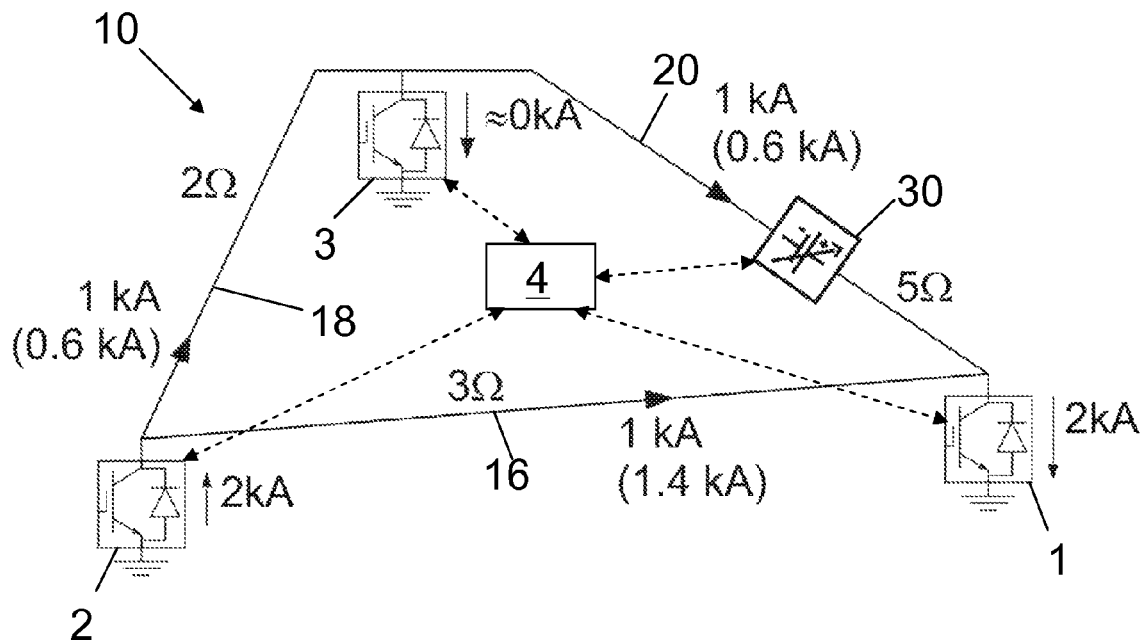

The invention is related to a meshed HVDC power transmission network comprising at least three HVDC converter stations interconnected in a first closed path by at least three transmission lines. The invention further relates to a method to control the power flow in such a network and to a DC power flow control device, which is arranged to be connected to one of the transmission lines of the network.

In the art, HVDC power transmission is mostly known to be realized in a point-to-point interconnection, via a two-terminal HVDC link. Such two-terminal HVDC links are HVDC transmission systems comprising two power converter stations, one at each end of a power transmission line. The power transmission lines are usually either monopolar lines or bipolar lines, comprising a first pole located at a high DC voltage of several hundred up to more than a thousand kV and a second pole for the return current which is connected to ground or to a high DC voltage of opposite polarity, respectively. Few so called multi-terminal HVDC power transmission systems or networks exist in reality as well, which comprise more than just two converter stations and more than just one transmission line. A good example is the HVDC transmission network between Quábec, Canada, and New England, USA, which was the first large scale multiterminal HVDC transmission network in the world. This network comprises today three converter stations interconnected in a serial manner via two power transmission lines and covers a line distance of 1480 km. The linear interconnection of the converter stations can also be referred to as unmeshed network, in contrast with a meshed network comprising closed paths and a partly-meshed network comprising closed paths as well as linear interconnections.

In the future, more and partly even larger HVDC transmission networks are expected to be built, which might cover longer distances and/or larger areas and which could be used for example to transfer power between different continents. Such large HVDC transmission networks could be built from scratch, but could also be a result of newly added links between existing smaller HVDC transmission networks. For example, it is suggested in "Viability of a national HVDC Transmission Ring in India", by Mata Prasad et al, presented at Cigré Symposium, September 1999, Kuala Lumpur, Malaysia, that existing and future HVDC transmission networks in India as well as back-to-back HVDC links could be integrated in a so called HVDC ring scheme, which would in fact form a partly meshed HVDC network comprising a closed path and a linear interconnection. In the article it is pointed out that implementation and operation of such an enlarged HVDC transmission network requires considering specific issues in connection with a required hierarchical formulation of control algorithms, such as a co-ordination between the HVDC links constituting the network, ensuring an optimal power flow in the lines of each region of the network and stabilizing the grid in a region-wise manner.

Other documents dealing with multi-terminal HVDC networks focus mainly on the reliability and availability of the network, especially in case of line faults, such as in "Multi-terminal HVDC for High Power Transmission in Europe" by Michael Hausler, presented at the Central European Power Exhibition and Conference (CEPEX), March 1999, Poznan, Poland; or as in "Challenges with Multi-Terminal UHVDC Transmissions" by Victor F. Lescale et. al, presented at IEEE Power India Conference (POWERCON), 12-15 Oct. 2008, New Delhi, India.

The operation of a meshed HVDC network under fault-free working conditions has not been discussed in the art so far.

It is an object of the invention to propose a solution with which operation of a meshed HVDC network can be ensured over a wide range of loading conditions.

This object is achieved by a method to control the power flow in a meshed HVDC power transmission network according to claim 1, a network according to claim 7 and a DC power flow control device according to claim 9.

The invention is based on the recognition of the fact that in a meshed HVDC network with at least one closed path, it is possible to take advantage of the availability of at least two possible ways for the power flow in order to relieve those transmission lines which carry a very high current or even a current close to triggering an overcurrent protection function and/or device. According to the invention, the power flow in a meshed HVDC power transmission network comprising at least three HVDC converter stations interconnected in a first closed path by at least three transmission lines is controlled by supplying power to a first DC power flow control device, which is series connected to a first of the at least three transmission lines, where the power is tapped from that first transmission line, and by controlling the first DC power flow control device so that the DC current distribution in the first closed path is balanced. By balancing the power flow, i.e. by distributing the current flow in the meshed HVDC network as evenly as possible by rerouting the current through parallel connections so that heavily loaded lines are relieved, the power transmission capacity of the network is optimally used, losses are reduced and unnecessary intervention of overcurrent protection devices is avoided. In addition, it can be avoided that overhead-lines, which not always are protected by overcurrent protection devices, do no longer cause an earth fault due to increasing their length as a result of high current flows. As has happened in several cases around the world, heavily loaded overhead transmission lines may increase their length as a result of the generated heat to such an extent that they sag considerably and make physical contact with an earthed object, as for example a plant growing underneath them. The resulting earth fault may be the starting point for the development of a larger black out. This situation can be avoided due to the present invention, if the thermal capability of the transmission lines is taken into account when redistributing the current flow.

It is preferably assumed that the meshed HVDC power transmission network is controlled by a central control unit. The meshed HVDC power transmission network can be either a stand-alone network or a sub-network which is part of a larger HVDC power transmission network or of a mixed power transmission network comprising one or several AC power transmission networks. The central control unit can accordingly control the meshed HVDC network alone, be it a stand-alone or a sub-network, or it can control a part of the larger HVDC or the mixed network or it can control the entire larger HVDC or the entire mixed network. One of the tasks of the central control unit is to ensure that none of the transmission lines which are part of the controlled network and in particular part of the meshed HVDC power transmission network carries an overcurrent.

In a first embodiment of the meshed HVDC power transmission network, it is suggested that the central control is adapted to detect whether the DC current level in one of the at least three transmission lines exceeds a DC current limit and, if so, to send out a current control signal to the first DC power flow control device in order to initiate the first DC power flow control device to inject an additional DC voltage into the first transmission line so that the DC current level in the first transmission line is appropriately increased or reduced. The current control signal comprises preferably the desired magnitude and sign of the additional DC voltage to be injected, but it may as well be just the DC current limit for the first transmission line in connection with some information about the status of the DC current levels in the other transmission lines in the same closed path, leaving the task to determine the desired magnitude and sign of the additional DC voltage to be injected to an internal control unit in the first DC power flow control device.

In a more specific embodiment of the invention, the first DC power flow control device is controlled to inject an additional DC voltage into the first transmission line in order to reduce the DC current level in the first transmission line in case that the DC current level of the first transmission line exceeds its DC current limit. The DC current limit should advantageously be chosen to be lower than the thermal capability limit of the first transmission line and/or lower than the limit which would trigger a specific overcurrent protection function and/or device. The additional DC voltage can be either a negative or a positive voltage, since depending on the relative location of the first DC power flow control device to the ends of the first transmission line, either a negative or a positive voltage injection results in reducing the voltage difference between the two ends of the first transmission line so that the DC current level in the line is reduced. In a further development of the first embodiment, the DC current level in the first transmission line is only reduced if the DC current level in other of the at least three transmission lines forming a parallel connection to the first transmission line lies below their DC current limit. Accordingly, it is ensured that the transmission lines of the parallel connection indeed have the capacity to take over the current difference by which the current level in the first transmission line is reduced. By supplying the power to the first DC power flow device from the first transmission line instead for from an external power supply or an external power supplying network, the first DC power flow device becomes independent of any additional infrastructure and can thereby be located wherever it is best from a network design standpoint, even at remote and hardly accessibly places.

In a second embodiment of the invention, the first DC power flow control device is controlled to inject an additional DC voltage into the first transmission line in order to increase the DC current level in the first transmission line in case that the DC current level of one other transmission line which belongs to a parallel connection to the first transmission line exceeds its DC current limit. Again, the additional DC voltage can be positive or negative, depending on the relative location of the first DC power flow control device to the ends of the first transmission line. Opposed to the first embodiment, the aim this time is not to reduce the voltage difference between the two ends but to increase the voltage difference so that the DC current level in the first transmission line is increased. As with the first embodiment, it is of advantage to check whether the first transmission line indeed has the capacity to take over some current from the parallel connection, i.e. the DC current level of the one other transmission line is only reduced if the DC current level in the first transmission line lies below its DC current limit. The reduction of the DC current level of the one other transmission line implies of course that the DC current levels in all other transmission lines connected in series in the same parallel connection are reduced as well.

In a further embodiment of the invention, the HVDC network comprises more than three HVDC converter stations, where a couple of HVDC converter stations are interconnected in a first closed path and a couple of HVDC converter stations are interconnected in second closed path and where one or some HVDC converter stations may be part as well of the first as of the second closed paths. In such a HVDC network, a second DC power flow control device can be series connected to a second transmission line belonging to the second closed path. According to the further embodiment of the invention, power is supplied to the second DC power flow control device, where the power is tapped from that second transmission line, and the second DC power flow control device is controlled so that the DC current distribution in the second closed path is balanced. Accordingly, it becomes possible to control the power flow even in very large and densely interconnected meshed HVDC network by strategically placing DC power flow control devices in each of the closed paths so that the current distribution in the whole network can be balanced and optimized and thereby the power transmission capacity of the network can be optimally used.

According to a specific embodiment of the meshed HVDC power transmission network, the converter stations of the network each comprise a voltage source converter (VSC). The multi-terminal HVDC schemes in operation today are all utilizing the classic HVDC technology with line commutated converter (LCC). However, more and more two-terminal HVDC links based on the VSC-technology are introduced on the market. as described in Agelidis et al, "Recent Advances in High-Voltage Direct-Current Power Transmission Systems", presented at the National Power Electronics Conference of China, Xian, China, Sep. 23-26, 2006. As a voltage source converter operates with the same voltage polarity independent of the actual power flow direction, this technology is very suitable for a multi-terminal and thereby for a meshed HVDC power transmission network since the power flow in the network can vary in both directions without any need for switching actions.

Figure 2:
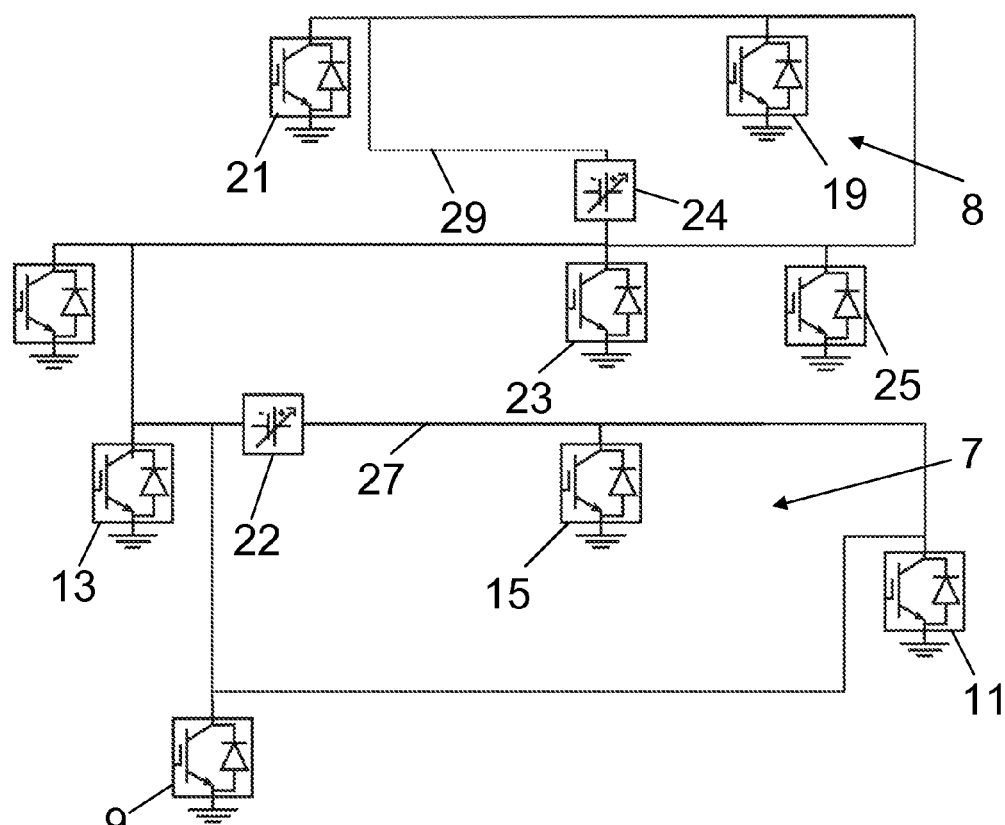
Figure 3:
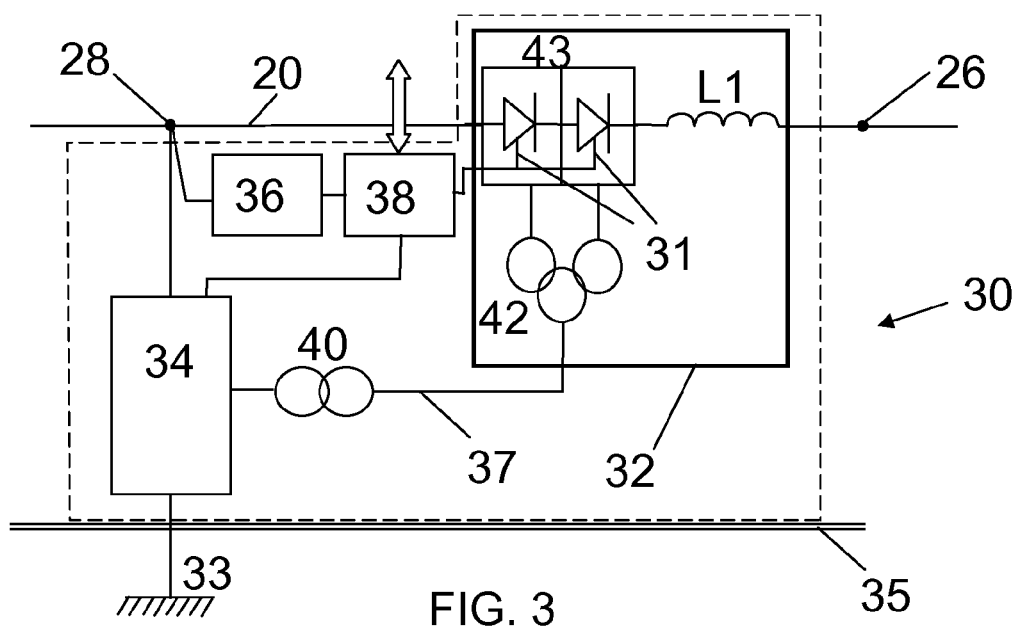
Figure 4:
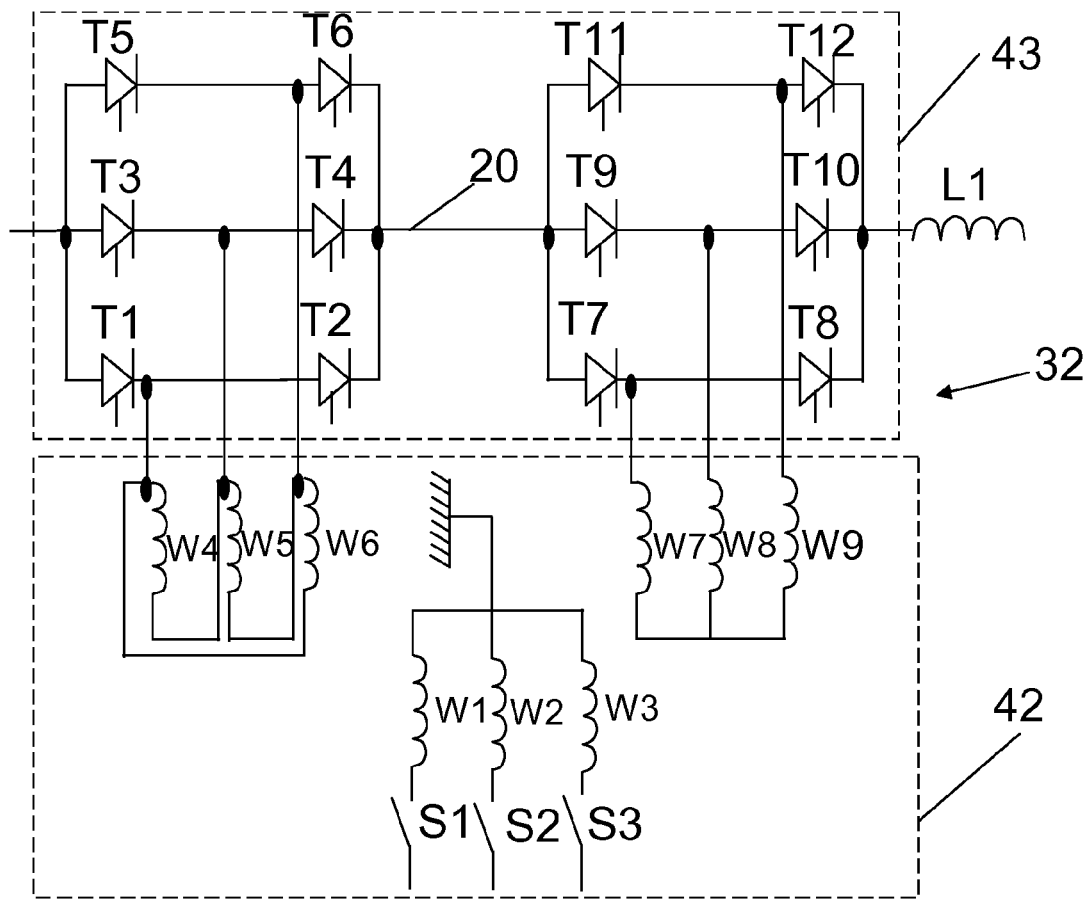
Figure 5:
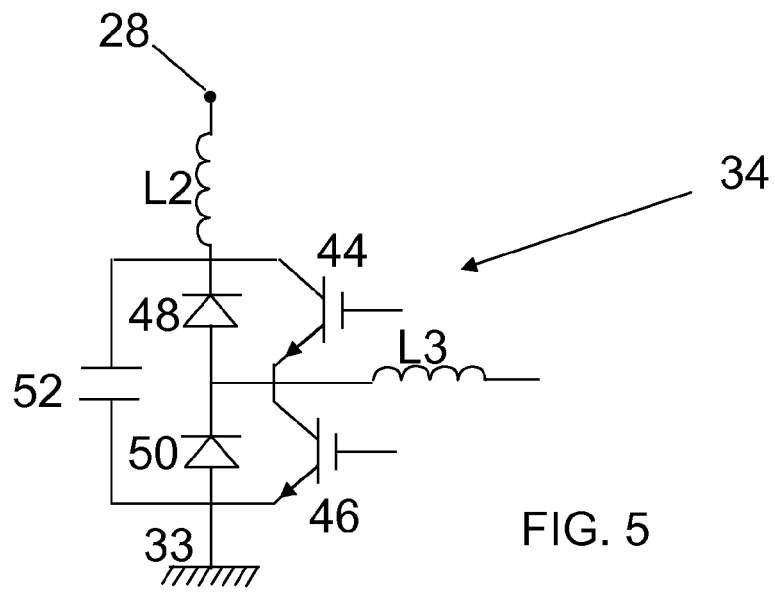
Figure 6:
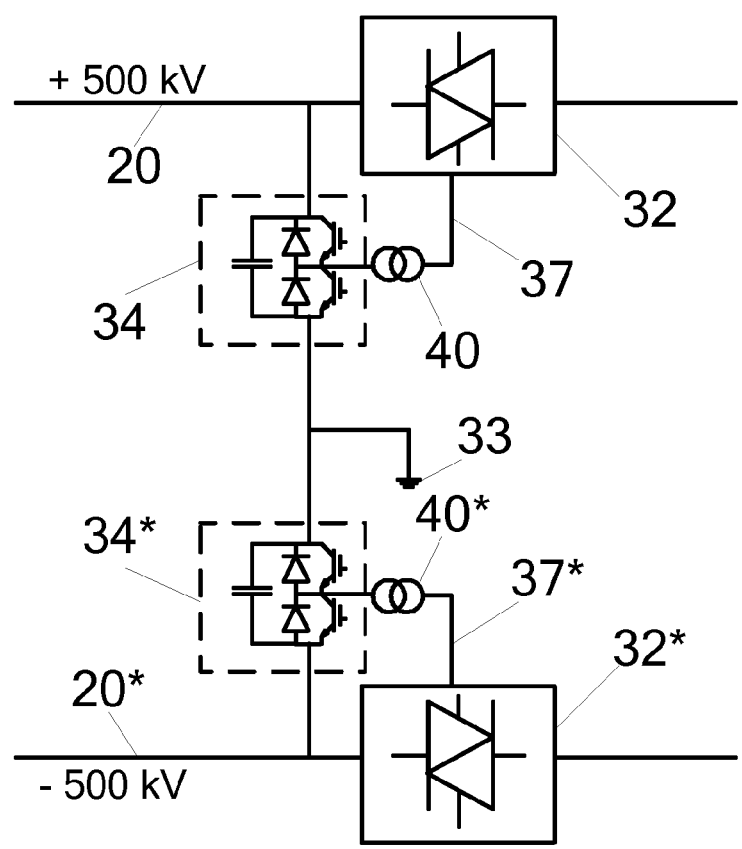
Figure 7:
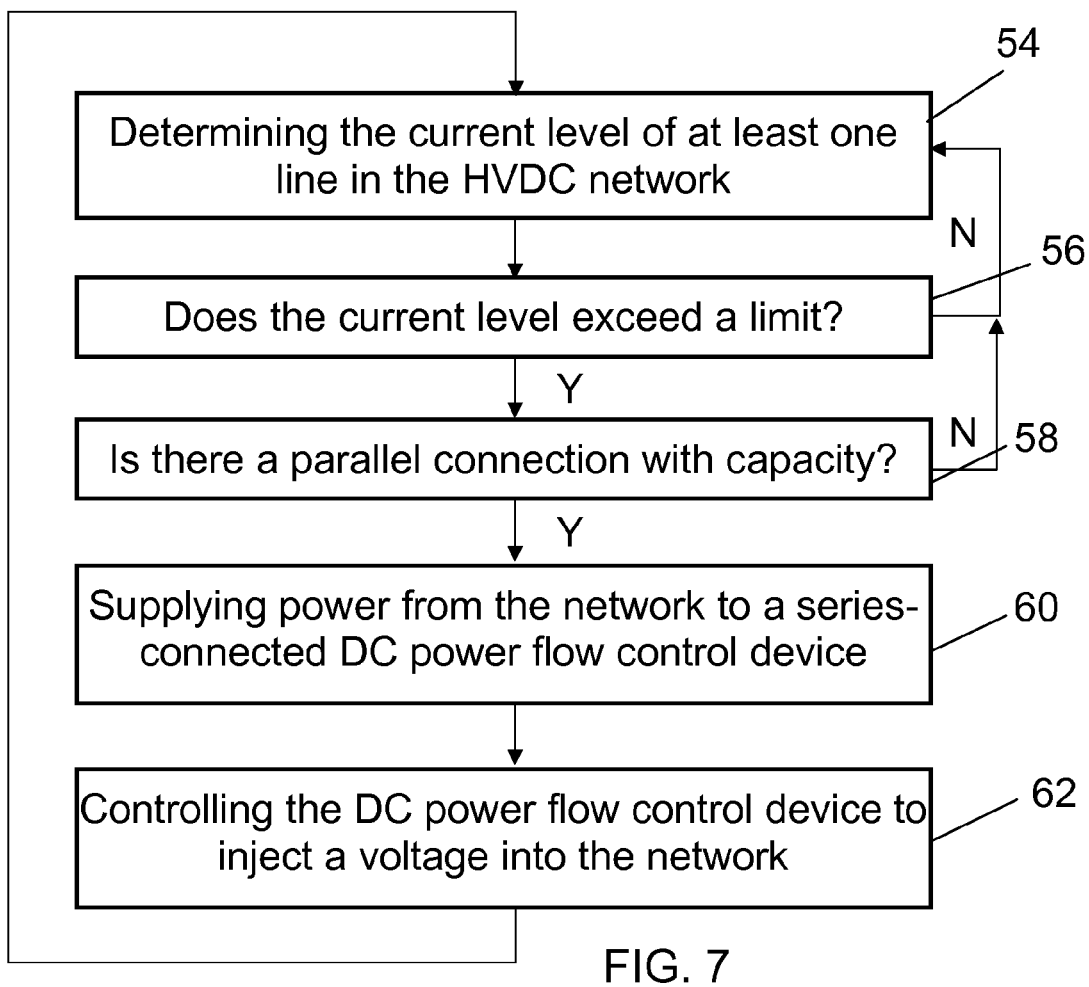
Figure 8:
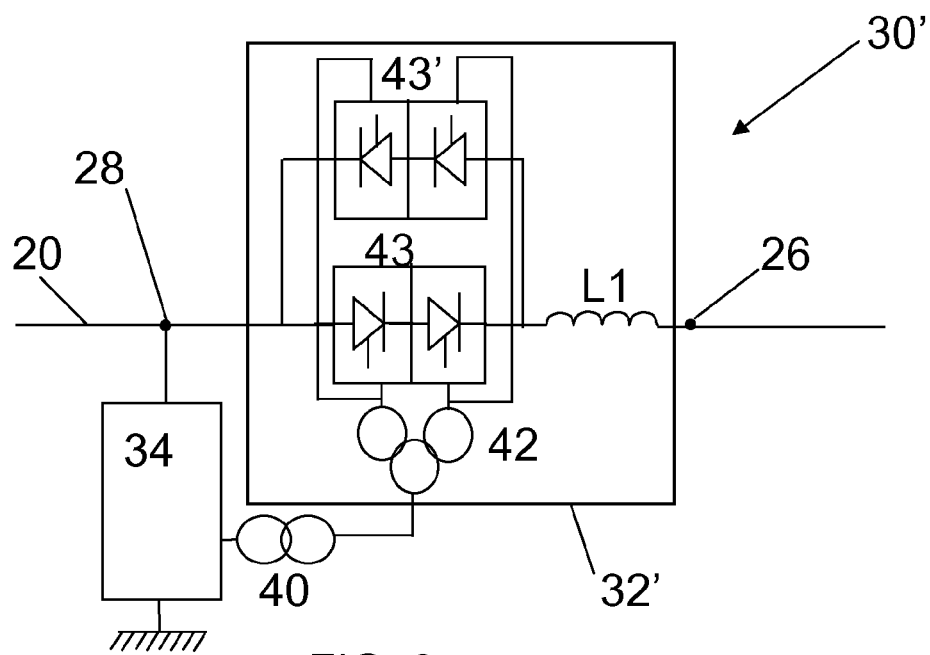
Figure 9:
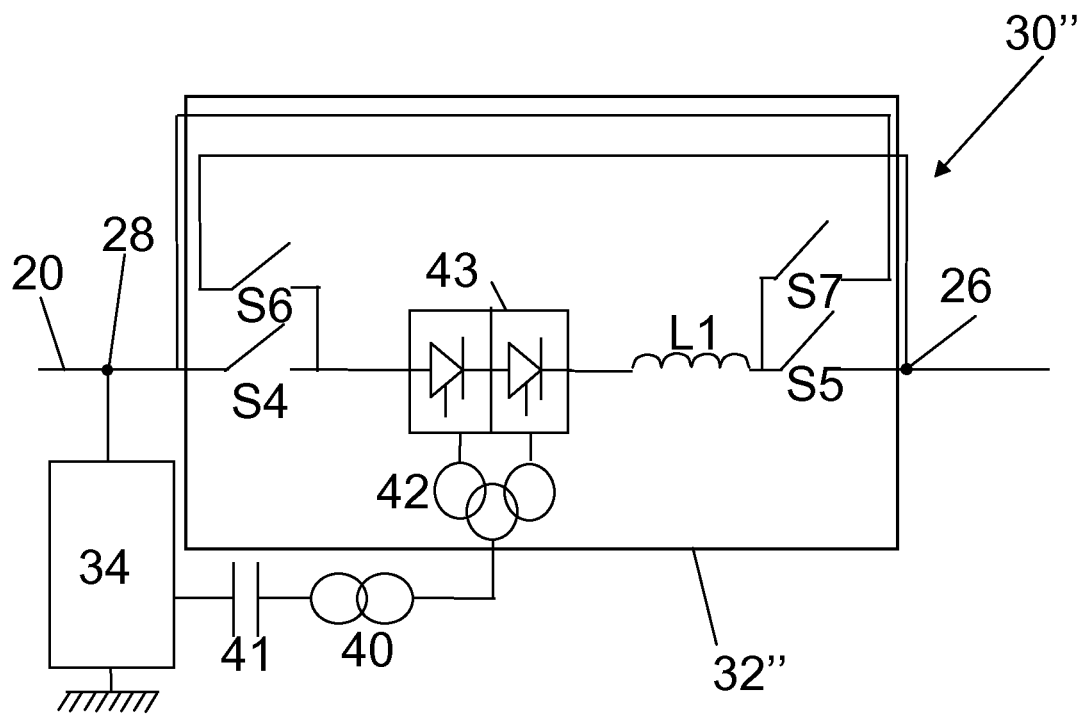
Figure 10:
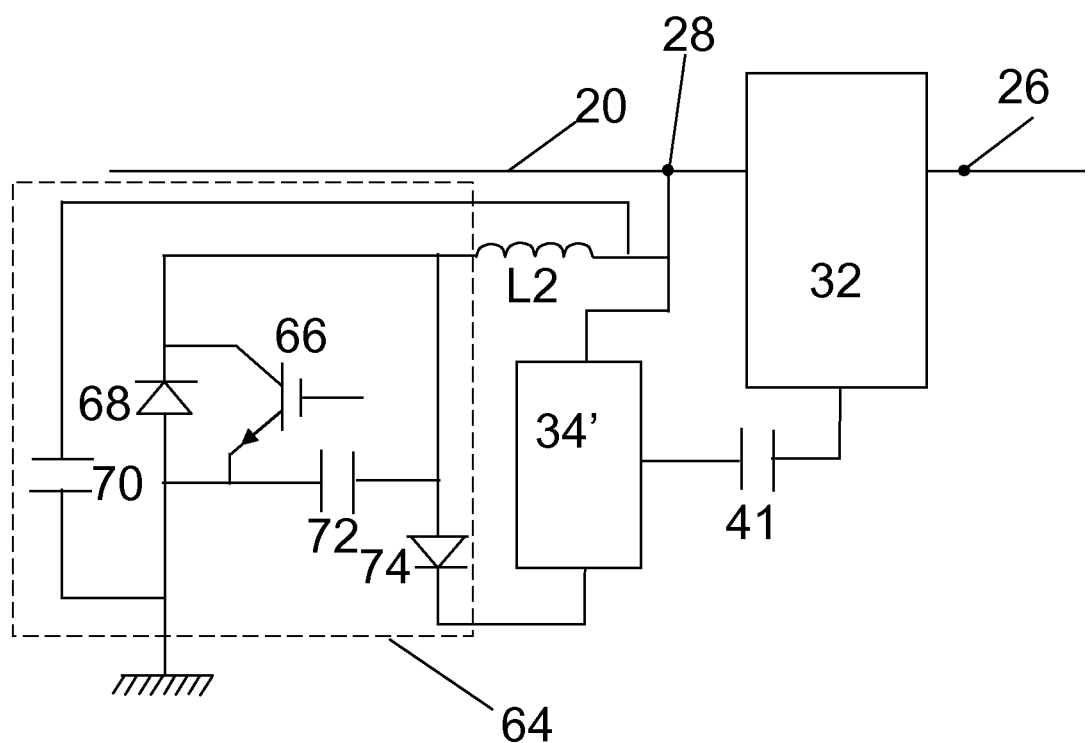

Other features and advantages as well as further embodiments of the present invention will become more apparent to a person skilled in the art from the following detailed description in conjunction with the appended drawings, in which:

FIG. 1 shows a meshed HVDC power transmission network according to the invention comprising a first closed path, FIG. 2 shows a meshed HVDC power transmission network comprising a first and a second closed path, FIG. 3 shows a first embodiment of a DC power flow control device for a monopolar transmission line, FIG. 4 shows the first converter of the DC power flow control device of FIG. 3 in detail, FIG. 5 shows the second converter of the DC power flow control device of FIG. 3 in detail, FIG. 6 shows the first embodiment of a DC power flow control device for a bipolar transmission line, FIG. 7 shows the steps of a method to compensate a voltage drop in a multi-terminal HVDC power transmission network, FIG. 8 shows a second embodiment of a DC power flow control device for a monopolar transmission line, FIG. 9 shows a third embodiment of a DC power flow control device for a monopolar transmission line, FIG. 10 shows a fourth embodiment of a DC power flow control device for a monopolar transmission line.

FIG. 1 shows a meshed HVDC power transmission network 10 in the form of one closed path, also called a first closed path, interconnecting three HVDC converter stations 1, 2 and 3 via the transmission lines 16, 18 and 20, respectively. The power flow directs from the converter station 2 to the converter stations 1 and 3 and from converter station 3 to converter station 1, as is indicated by the arrows for the current direction. Between converter stations 1 and 3, a DC power flow control device 30 is series connected to transmission line 20, which has the capability to adjust the current distribution in the first closed path so that it is balanced in order to avoid overcurrent in any of the three transmission lines. The DC power flow control device 30 receives its power directly from transmission line 20. A central control unit 4 controls the operation of the HVDC power transmission network 10, and therefore communicates with the converter stations 1, 2 and 3 as well as with the DC power flow control device 30, as is indicated by the dashed double arrows.

A method to control a meshed HVDC power transmission network is schematically depicted in FIG. 7. The method is performed by a control unit, which can be either a control unit integrated in a DC power flow control device or a central control unit supervising and monitoring the HVDC network. In a first step 54, the current level of at least one line in the HVDC network is determined, where the at least one line is a line known or expected to be critical with respect to the possible exceeding of an acceptable current level. In second step 56, it is decided whether the determined current level exceeds a DC current limit. This DC current limit is a current limit which indicates a high current level on the line but which lies below the thermal capability limit of the line and/or below the current limit triggering an overcurrent protection function and/or device. The current limit value can be different for each transmission line in the network, depending on the individual line characteristics. If the current level determined in first step 54 does not exceed the limit, the method returns to first step 54 and continues to monitor the current level. If the current level exceeds the limit, it is checked in third step 58 whether a parallel connection in the network exists which could take over part of the current, i.e. whether there is a parallel connection or parallel current path to the line with the excessive current level which has some current capacity remaining. This can for example be determined by comparing the current levels of the transmission lines in the parallel connection with their respective current limits. If no parallel connection with remaining current capacity can be found, the method returns to step 54. Otherwise, power is supplied to at least one series connected DC power flow control device, which is performed in fourth step 60. In fifth step 62, the at least one DC power flow control device is controlled to inject an additional DC voltage into the HVDC network, where the magnitude and sign of the additional voltage is chosen so that the voltage difference on the transmission line the DC power flow control device is connected to is either reduced to reduce the current level on that line or is increased to increase the current level on that line, where the current level is reduced only by a magnitude which can be taken over by the parallel connection.

In the example of FIG. 1, the current level of all three lines 16, 18 and 20 is determined. In the example it is assumed that at first the current distribution is quite unbalanced, which is indicated by the current levels shown in brackets. As can be seen, in the HVDC network 10 two parallel connections exist where a current may flow from converter station 2 to converter station 1. On the first connection, formed by transmission lines 18 and 20, the current level originally is only 0.6 kA, while on the second, parallel connection formed by transmission line 16 the current level originally is only 1.4 kA. It is assumed that the current limit is set to 1.1 kA for all three transmission lines 16, 18 and 20. Accordingly, in step 56, it is recognized that the current level on transmission line 16 is too high. As a result, it is checked in step 58 if the parallel connection has some current capacity remaining, i.e. if the current level on transmission lines 18 and 20 lies below its current limit and how far below the limit it lies. Since there is enough current capacity remaining on transmission lines 18 and 20, as is realized from the difference of 0.5 kA between the lines current limit and its current level, the DC power flow control device 30 is power supplied from transmission line 20 and it is controlled to inject an additional positive voltage into transmission line 20 so that the voltage difference between converter stations 3 and 1 is increased. Accordingly, the current flowing through transmission line 20 and through all other transmission lines connected in series in the same current path, i.e. here transmission line 18, is increased. The additional DC voltage needs to be a positive one since the DC power flow control device 30 is directed in the current flow direction in lines 18 and 20 and the current in the lines shall be increased. The orientation of the DC power flow control device 30 can be seen in FIG. 1 from the plus and minus signs in the four-quadrant diagram depicted on the symbol for the voltage source device 30, which indicates that a positive voltage is injected from upper left to lower right, i.e. in the same direction as the current flows on transmission line 20 in FIG. 1.

The orientation signifies the polarity of the voltage generated and injected by the DC power flow control device 30 in case of a positive additional DC voltage. In the opposite case, if the current in transmission lines 18 and 20 had to be reduced, the additional DC voltage required to reduce the current on transmission line 20 would be a negative one. As is shown in FIG. 1, the current level on transmission lines 16 and 18 is increased by 0.4 kA, so that consequently 1 kA flows through all three transmission lines, i.e. the current distribution on HVDC network 10 becomes evenly balanced.

In FIG. 2, an example for another possible HVDC network topology different from FIG. 1 is shown, in order to illustrate how multiple DC power flow control devices could be arranged in more than one closed paths to balance the current distribution in the network. The network comprises two closed paths 7 and 8, each comprising four converter stations, 9, 11, 13, 15 and 19, 21, 23, 25, respectively. The two closed paths 7 and 8 are interconnected via a linear interconnection between the converter stations 13 and 23, with a further converter station in between. A first DC power flow control device 22 is series connected to the transmission line 27 between converter stations 13 and 15 in the first closed path 7 in order to balance the current distribution in that first closed path 7. A second DC power flow control device 24 is series connected to the transmission line 29 between converter stations 21 and 23 in the second closed path 8 in order to balance the current distribution in that second closed path 8. By controlling the first and the second DC power flow control devices 22 and 24 in a coordinated manner, the current level can be adjusted not only inside the closed paths but also in the linear interconnection, i.e. on the transmission lines interconnecting converter stations 13 and 23. The two DC power flow control devices 22 and 24 are both power fed directly from the transmission lines they are connected to.

How such a line fed DC power flow control device could be implemented will be explained with the various embodiments described in the following.

A first embodiment of a DC power flow control device 30 is schematically shown in FIG. 3. The DC power flow control device 30 is series connected to transmission line 20 (see FIG. 1) and is depicted as a dashed box. The DC power flow control device 30 is more particularly connected to the transmission line 20 between a so called voltage injection point 26 and a power tapping point 28. Transmission line 20 is located at a high DC voltage level, which is here nominal 300 kV, and is in the example of FIG. 3 a monopolar transmission line. As is indicated by a double line, the DC power flow control device 30 is mounted on an insulated platform 35. This platform 35 is preferably connected to the same voltage level as transmission line 20, i.e. to 300 kV.

The DC power flow control device 30 includes a first converter 32, which here is a line commutated converter (LCC), as is for example known from the art described in Erich Uhlmann, "Power Transmission by Direct Current", Springer-Verlag Berlin-Heidelberg-New York, 1975. The first converter 32 acts as a rectifier to transform an AC voltage into a DC voltage and is thereby able to inject a DC voltage into transmission line 20 between the power tapping point 28 and the voltage injection point 26, i.e. in series with the line and oriented from power tapping point 28 to voltage injection point 26. The first converter 32 in turn includes a first transformer 42, a first set 43 of current valves and a first inductor L1. The current valves in this first set 43 each have control terminals 31 and are provided in series with each other and in series with the transmission line 20 between the voltage injection point 26 and the power tapping point 28, where the valves are connected directly to the power tapping point 28 and indirectly via the series connected first inductor L1 to the voltage injection point 26. The current valves have an orientation in relation to the line which allows current to run in one direction in the line while stopping current from running in the opposite direction. The first set 43 of current valves is furthermore divided into sections, where one first section is connected to a first winding or a first set of phase windings of the first transformer 42 and a second section is connected to a second winding or a second set of phase windings of the first transformer 42, where the first transformer 42 is a three-phase three-winding transformer. Each section here provides one part of the voltage to be injected into transmission line 20 by the first converter 32.

FIG. 4 shows a possible realization of the first converter 32 in further detail. The first transformer 42 of the LCC converter is a three-phase three-winding transformer, which has a third set of phase windings W1, W2 and W3 being magnetically connected to a first set of Delta-interconnected phase windings W4, W5 and W6 as well as to a second set of Y-interconnected phase windings W7, W8 and W9. A first end of each phase winding W1, W2 and W3 in the third set is connected to a second transformer 40 (see FIG. 2) via a respective switch S1, S2 and S3, while a second end of these windings W1, W2 and W3 are jointly connected to local ground on the platform.

A first section of the first set 43 of current valves of the first converter 32 includes six current valves, here in the form of thyristors, where a first and a second current valve T1 and T2 are connected in a first branch in series with transmission line 20, a third and a fourth valve T3 and T4 are connected in a second branch in series with transmission line 20 and a fifth and a sixth current valve T5 and T6 are connected in a third branch in series with transmission line 20. The first, second and third branches are thus connected in series with transmission line 20 and in parallel with each other. A first end of one phase winding W4 in the first set of phase windings is connected into the first branch between the first and the second current valves T1 and T2. A second end of the same phase winding W4 is connected to a first end of another phase winding W5, where the first end of this other phase winding W5 is also connected to the second branch between the third and the fourth current valves T3 and T4. A second end of the other phase winding W5 is connected to a first end of the final phase winding W6 in the first set of windings. This first end of the final phase winding W6 is also connected into the third branch between the fifth and the sixth current valves T5 and T6, while a second end of this final phase winding W6 is connected to the first end of the first mentioned phase winding W4 in the first set of phase windings, thereby providing a Delta-connection.

A second section of the first set 43 of current valves of the first converter 32 is of the same type and is provided in the same way in series with transmission line 20 as the first section, where the first and the second sections are arranged in series with each other between the power tapping point 28 and the first inductor L1. In the second section there are thus also three parallel branches with two current valves each, T7, T8 or T9, T10 or, T11, T12, respectively. A first end of each phase winding W7, W8 and W9 of the second set of windings is connected between the two current valves of a corresponding branch, while the second ends of the phase windings W7, W8, W9 of the second set of windings are connected to each other, thereby providing a Y-connection.

Referring now again to FIG. 3, the DC power flow control device 30 comprises besides the first converter 32 a current detector 36, which in this embodiment is connected to the power tapping point 28 in order to determine a current level of the DC current in transmission line 20. The current detector 36 is in turn connected to a control unit 38. The control unit 38, which may be realized through the use of a processor and associated program memory, determines a desired additional DC voltage which needs to be injected into transmission line 20 in order to reduce or increase the current level determined by current detector 36 and calculates the corresponding control signals to be applied to the first set 43 of current valves. The control unit 38 emits the corresponding control signals to the control terminals 31 of the current valves. The voltage to be injected is here typically realized through suitable variation of the phase angle of the current valves. The control unit 38 is further connected to a second converter 34, the structure and function of which are explained below.

DC power flow control device 30 comprises the second converter 34 which is shunt connected between the power tapping point 28 of transmission line 20 and a grounding terminal 33 and which is also controlled by control unit 38. The second converter 34 is thus provided between the transmission line 20 and the ground, in the same way as converters 1 and 3 in FIG. 1. The second converter 34 is further connected to the second transformer 40 which itself is connected via line 37 to the third winding or the third set of phase windings of first transformer 42.

The second converter 34 in the embodiment of FIG. 3 is a voltage source converter (VSC) 34, which acts as an inverter, i.e. it converts an input DC voltage into an output AC voltage. The input DC voltage here is the voltage at the power tapping point 28 and the output AC voltage is the input voltage of transformer 40, transformed into a desired AC voltage level on line 37. Line 37 can accordingly be regarded as a local AC network arranged on platform 35, which is used as a feeding network for the first converter 32 and as an auxiliary power supply for further devices on the platform, such as a circuit breaker, where such further devices are not shown in the figures.

One possible realization of the second converter 34 is schematically shown in FIG. 5, where there are two current valves 44 and 46, here in the form of two insulated gate bipolar transistors (IGBT), connected in series, with each current valve 44 and 46 having a diode 48 and 50, respectively, in anti-parallel connection thereto. A capacitor 52 is connected in parallel with both the current valves 44 and 46, i.e. it is connected between the collector of the IGBT of the first current valve 44 and the emitter of the IGBT of the second current valve 46. A second inductor L2 is connected between the power tapping point 28 on transmission line 20 and the series connected current valves. The connection point between the current valves 44 and 46 is connected to a third inductor L3, which itself is connected to the second transformer 40 of FIG. 2. The first, second and third inductors L1, L2 and L3 indicate the presence of filters which filter high frequency harmonics.

In case the HVDC power transmission network 10 is a bipolar system, with the first pole being transmission line 20, DC power flow control device 30 comprises a duplicate of its basic components being used in the monopolar case (see FIG. 3), as is shown in FIG. 6. The duplicated basic components are a duplicated first converter 32*, a duplicated second converter 34*, a duplicated second transformer 40* and a duplicated local AC network line 37*, which are connected to each other and to the second pole 20* in the same way as the original components to the first pole.

An example for how the DC power flow control device of the present invention may be operated will now be described with reference to the previously described FIGS. 1-5 and 7. Detector 36 may be used to continuously monitor the DC current level of transmission line 20, according to first and second method steps 54 and 56 in FIG. 7. The detected DC current level is forwarded via control unit 38 to the central control unit 4, which then determines whether an additional DC voltage needs to be injected into transmission line 20 and if so, what magnitude and sign the voltage should have. The detected DC current level is sent to the central control unit 4 and a so called current control signal is received by the control unit 38 from the central control unit 4 via a bi-directional communication line between the central control unit 4 and the control unit 38, which is indicated in FIG. 3 as a block double arrow. The central control unit 4 performs the functions to determine whether and which additional DC voltage needs to injected based on the current level detected by current detector 36 as well as based on further information such as the DC current limit defined for transmission line 20, the direction of the DC power flow control device 30, and the actual DC current levels as well as the corresponding DC current limits of the other transmission lines in the same closed path as transmission line 20. If the detected DC current level of either transmission line 20 or one of the transmission lines in the same closed path, i.e. transmission lines 16 and 18, exceeds its DC current limit, the central control unit 4 decides that an additional DC voltage needs to be injected into transmission line 20. In that case, the central control unit 4 further determines, according to third step 58, if the remaining current capacity in a connection parallel to the transmission line with the current level exceeding its DC current limit would be sufficient to take over some current. If not, the method returns to step 54, i.e. no action is taken.

In an alternative solution for the situation where no current capacity is remaining in the closed path, the central control unit 4 may decide to reduce the current in all the transmission lines 16, 18 and 20 belonging to the closed path. In that case, the central control unit 4 would have to take further measures apart from steps 60 and 62, such as sending out appropriate control signals to the converter stations 1, 2 and 3 requesting them to reduce the overall current. These further measures are not described here.

In case the current capacity in the parallel connection suffices, depending on the difference between the exceeding DC current level and its corresponding DC current limit, as well as, the magnitude of the remaining current capacity and the direction of DC power flow control device 30, the desired magnitude and sign of the additional DC voltage to be injected is calculated by the central control unit 4 and sent as current control signal to the control unit 38. In this way, the DC power flow control device 30 is initiated to start to tap power from transmission line 20 via second converter 34 and to inject an appropriate voltage into transmission line 20 via the first converter 32, according to steps 60 and 62.

To achieve that, the control unit 38 calculates, depending on the desired magnitude and sign of the additional DC voltage to be injected, control signals which it sends to the second converter 34 and to the first converter 32 in order to initiate them to provide and inject the additional DC voltage into transmission line 20, respectively. The additional DC voltage is then injected by the first converter 32 between the power tapping point 28 and the voltage injection point 26. More particularly, the provision of the additional DC voltage, according to fourth step 60 of FIG. 7, is performed through the second converter 34 by tapping DC power from the transmission line 20 at the power tapping point 28. The tapped DC power is then converted to an intermediate AC power by the second converter 34 and the second transformer 40, which intermediate AC power is further converted by the first transformer 42 in order to apply an appropriate AC voltage to the first converter 32. The injection of the additional DC voltage into transmission line 20 is then performed by appropriate switching of the first set 43 of current valves of the first converter 32, so that the AC voltage is converted into DC voltage and that the level and polarity of the DC voltage is adjusted to the level and polarity of the desired additional DC voltage calculated by the control unit 38.

In an alternative solution, where the control unit 38 is equipped with communication means to communicate with other devices in the HVDC power transmission network 10, it would also be possible that the control unit 38 itself performs all the steps 54 to 62 alone or that the steps would be shared in another way as described above between the central control unit 4 and the control unit 38 or even between further control units.

Since the power needed for adjusting the current level was provided through tapping of the power from the power line itself, no exterior power supplies are required, which means that the DC power flow control device of the present invention can be provided at remote and inaccessible locations.

The design of the series connected DC power flow control device according to the present invention can be varied in a multitude of ways, where some will now be described.

FIG. 8 shows a second embodiment of a DC power flow control device 30' and FIG. 9 shows a third embodiment of a DC power flow control device 30", which both for the most part have the same structure as DC power flow control device 30 of FIG. 3 and which are designed to handle reversed current on transmission line 20. As can be seen, their first converters 32' and 32", respectively, differ from the first converter 32 of FIG. 3, while, for the purpose of simplicity, the current detector 36 and control unit 38 are not shown in both Figures, even though they are present in both DC power flow control devices 30' and 30".

In FIG. 8, the first converter 32' comprises a first set 43 of current valves and, in addition, a second set 43' of current valves, here provided in sections including branches in the same way as in the first set. This second set 43' of current valves is connected in anti-parallel with the first set 43. The second set 43' is further connected to the first transformer 42 in the same way as the first set 43 of current valves and receives the same control signals.

The first converter 32" in FIG. 9 provides essentially the same type of functionality as the first converter 32' in FIG. 8, but requires only the first set 43 of current valves. Here, the arrangement for handling reversed currents includes a group of switches S4, S5, S6 and S7 arranged to reverse the orientation of the current flowing through the current valves in the first set 43 in relation to the transmission line 20. The switches S4 and S5 are placed in series with the transmission line 20, switch S4 between the power tapping point 28 and the first set 43 of current valves and switch S5 between the first inductor L1 and the voltage injection point 26. Switch S6 is provided in a branch that stretches from a connection point between switch S4 and the first set 43 of current valves to the voltage injection point 26, while switch S7 is provided in a branch that stretches from the power tapping point 28 to a connection point between switch S5 and the first inductor L1.

When current is running from left to right in FIG. 9, switches S4 and S5 are closed while switches S6 and S7 are open. If current is running in the opposite direction, then switches S4 and S5 are open, while switches S6 and S7 are closed.

The third embodiment according to FIG. 9 differs furthermore from the first embodiment according to FIG. 3 in that a capacitor 41 is connected in series with the second transformer 40 in order to filter out any DC voltage, so that the second transformer 40 sees a pure AC voltage.

According to a fourth embodiment of a DC power flow control device, as shown in FIG. 10, it is possible to omit the second transformer 40. In this case, a further converter, which is a DC-DC converter 64, is used to adjust the voltage level. In this example, the second inductor L2 placed outside of the second converter 34' and is connected in shunt to the second converter 34' between the power tapping point 28 and the DC-DC converter 64. In all other respects the second converter 34' is the same as the second converter 34 in FIG. 3. The DC-DC converter 64 includes an IGBT 66 being connected with its collector to the second inductor L2 and with its emitter to ground. A diode 68 is connected in anti-parallel to the IGBT 66. A capacitor 70 is connected in a parallel branch stretching between the power tapping point 28 and ground. A further capacitor 72 is connected between the emitter of IGBT 66 and the second inductor L2. Finally, a further diode 74 is connected between the second inductor L2 and the grounding terminal of the second converter 34' and is oriented towards this grounding terminal. The DC-DC converter 64 converts the DC voltage of transmission line 20 to a lower level suitable for the voltage level to be output by the second converter 34', which therefore does not need the second transformer 40 on its output side.

Further variations and implementations of the DC power flow control device are possible. For example, other types of current valves may be used, such as MOSFET transistors, GTOs (Gate Turn-Off Thyristor) and mercury arc valves. The number of sections and current valves provided in the converters may furthermore be varied or the converters could be arranged as a series connection of multiple sub-converters. In addition, a parallel connected bypass switch could be provided which is closed whenever the DC power flow control device is not needed. It should also be realized that various protective measures may be used such as harmonics filters, circuit breakers and device disconnection switches. Apart from that, the current detector and the control unit need not be an integral part of the DC power flow control device, but may be provided as one or two separate devices instead. Therefore, in this application, the invention is applied in a multi-terminal scheme of VSC HVDC converters. However, it is equally applicable in a multi-terminal scheme with classic LCC HVDC converters.

The invention claimed is:

1. A method to control the power flow in a meshed HVDC power transmission network comprising at least three HVDC converter stations interconnected in a first closed path by at least three transmission lines, a first DC power flow control device, which is series connected to a first of the at least three transmission lines, the first DC power flow control device comprising a first converter in series connection with the first transmission line and a second converter in shunt connection with the first transmission line, the method comprising the steps of:
    converting, by the second converter working as an inverter, DC power from the first transmission line into AC power;
    supplying, by the second converter, the first converter with said AC power; and
    injecting, by the first converter, an additional positive or negative DC voltage into the one transmission line based on the AC power supplied from the second converter for controlling the first transmission line so that the DC current distribution in the first closed path is balanced.

2. The method according to claim 1, further comprising the step of determining whether the DC current level in one of the at least three transmission lines exceeds its DC current limit and, if so, initiating the first DC power flow control device to inject an additional DC voltage into the first transmission line so that the DC current level in the first transmission line is appropriately increased or reduced.

3. The method according to claim 2, where in case that the DC current level of the first transmission line exceeds its DC current limit, the first DC power flow control device is controlled to inject an additional DC voltage into the first transmission line in order to reduce the DC current level in the first transmission line.

4. The method according to claim 3, where the DC current level in the first transmission line is only reduced if the DC current levels in other of the at least three transmission lines, which form a parallel connection to the connection the first transmission line belongs to, lie below their DC current limit.

5. The method according to claim 2, where in case that the DC current level of one other transmission line, which belongs to a parallel connection to the connection the first transmission line belongs to, exceeds its DC current limit, the first DC power flow control device is controlled to inject an additional DC voltage into the first transmission line in order to increase the DC current level in the first transmission line.

6. The method according to claim 5, where the DC current level of the other transmission line is only reduced if the DC current levels in the transmission lines of the connection the first transmission line belongs to lie below their DC current limit.

7. The method according to claim 1, which is applied to a HVDC network comprising more than three HVDC converter stations and a comprising a second closed path and where the method comprises the additional steps of:
    supplying power to a second DC power flow control device, which is series connected to a second transmission line belonging to the second closed path, where the power is tapped from that second transmission line; and
    controlling the second DC power flow control device so that the DC current distribution in the second closed path is balanced.

8. A meshed HVDC power transmission network comprising:
    at least three HVDC converter stations interconnected in a first closed path by at least three transmission lines; and
    a first DC power flow control device being series connected to a first of the at least three transmission lines,
    wherein the first DC power flow control device comprises a first converter in series connection with the first transmission line and a second converter in shunt connection with the first transmission line, and wherein the second converter is configured to work as an inverter to convert DC power from the first transmission line into AC power to supply the first converter with, and the first converter is configured to work as a rectifier to provide an additional positive or negative DC voltage to be injected into the one transmission line based on the AC power supplied from the second converter for balancing the DC current distribution in the first closed path.

9. The network according to claim 8, comprising a central control unit which is adapted to detect whether the DC current level in one of the at least three transmission lines exceeds its DC current limit and, if so, to send out a current control signal to the first DC power flow control device in order to initiate the first DC power flow control device to inject an additional DC voltage into the first transmission line, thereby increasing or reducing, respectively, the DC current level in the first transmission line so that the DC current level in the transmission line which exceeds its DC current limit is reduced.

10. The Network according to claim 9, where the network comprises more than three HVDC converter stations and a second closed path and where a second DC power flow control device is series connected to a second transmission line belonging to the second closed path, where the second DC power flow control device takes its power from the second transmission line and balances the DC current distribution in the second closed path.

11. The Network according to claim 9, where the HVDC converter stations each comprise a voltage source converter.

12. The network according to claim 8, where the network comprises more than three HVDC converter stations and a second closed path and where a second DC power flow control device is series connected to a second transmission line belonging to the second closed path, where the second DC power flow control device takes its power from the second transmission line and balances the DC current distribution in the second closed path.

13. The Network according to claim 12, where the HVDC converter stations each comprise a voltage source converter.

14. The network according to claim 8, where the HVDC converter stations each comprise a voltage source converter.

15. A DC power flow control device, which is arranged to be connected to a first of at least three transmission lines of a meshed HVDC power transmission network, the network comprising at least three HVDC converter stations interconnected in a first closed path by the at least three transmission lines and the DC power flow control device being arranged to be series connected to the first transmission line, the DC power flow control device comprising a first converter in series connection with the first transmission line and a second converter in shunt connection with the first transmission line, wherein the second converter configured to work as an inverter to convert DC power from the first transmission line into AC power to supply the first converter with and where the first converter is configured to work as a rectifier to provide an additional positive or negative DC voltage to be injected into the one transmission line based on the AC power supplied from the second converter for balancing the DC current distribution in the first closed path.

16. The DC power flow control device according to claim 15, which in case that the DC current level in one of the at least three transmission lines exceeds its DC current limit injects an additional DC voltage into the first transmission line, thereby increasing or reducing the DC current level in the first transmission line appropriately.

17. The DC power flow control device according to claim 16, which in case that the DC current level in the first transmission line exceeds its DC current limit injects an additional DC voltage into the first transmission line in order to reduce the DC current level in the first transmission line.

18. The DC power flow control device according to claim 17, where the first converter is arranged to reverse the direction of its converter current.

19. The DC power flow control device according to claim 16, where in case that the DC current level of one other transmission line, which belongs to a parallel connection to the connection the first transmission line belongs to, exceeds its DC current limit, the first DC power flow control device injects an additional DC voltage into the first transmission line in order to increase the DC current level in the first transmission line.

20. The DC power flow control device according to claim 16, where the first converter is arranged to reverse the direction of its converter current.

* * * * *